United States Patent [19]

Skidmore, Sr.

[11] Patent Number: 4,815,903

[45] Date of Patent: Mar. 28, 1989

[54] AUXILIARY SUPPORT BEARING FOR A MILLING MACHINE HEAD

[76] Inventor: Samuel C. Skidmore, Sr., 1513 Azteca Dr., Fort Worth, Tex. 76112

[21] Appl. No.: 83,724

[22] Filed: Aug. 7, 1987

[51] Int. Cl.$^4$ .............................................. B23C 9/00
[52] U.S. Cl. ................................... 409/131; 409/144; 409/231; 409/239
[58] Field of Search ............... 409/204, 206, 209, 231, 409/239, 144, 137

[56] References Cited

U.S. PATENT DOCUMENTS

| | | | |
|---|---|---|---|
| 3,211,060 | 10/1965 | McCann | 409/231 |
| 3,429,224 | 2/1969 | Osburn | 409/231 |
| 4,557,645 | 12/1985 | Marsland | 409/144 |

FOREIGN PATENT DOCUMENTS 3235820  7/1983  Fed. Rep. of Germany ...... 409/231

*Primary Examiner*—Gil Weidenfeld
*Assistant Examiner*—Daniel W. Howell
*Attorney, Agent, or Firm*—Charles W. McHugh

[57] ABSTRACT

An auxiliary bearing apparatus for selective attachment to milling machines of the Bridgeport type, said machines having a head which supports a quill that is longitudinally movable with respect to a fixed housing. A tool-holding spindle is rotatable within the vertically movable quill at all times, both when the auxiliary bearing apparatus is installed and when it has been removed. The auxiliary bearing apparatus includes a support bearing which is adapted to be selectively attached to the housing near the bottom of the head, when the quill is fully retracted into the housing. Installation of the auxiliary bearing support is facilitated by providing a threaded retainer which engages a special extension of the housing, the special extension having threads for the express and singular purpose of accomodating the threaded retainer. When the quill is to be extended for some operation in accordance with the orginial design of the milling machine, the auxiliary bearing is easily removed by the machinist and temporarily set aside. When a new operation is to be done in which it is desired to support a spindle and its tool more rigidly (so that tool chatter or vibration is to be minimized), the quill is fully retracted into the housing and the auxiliary bearing apparatus is again installed. By providing precision bearings as a part of the auxiliary bearing apparatus, and providing a hardened surface against which the auxiliary bearing is tightened, the auxiliary bearing apparatus may essentially be installed and removed almost an infinite number of times without introducing any change in the degree of support made possible by the auxiliary bearing apparatus.

14 Claims, 3 Drawing Sheets

AUXILIARY SUPPORT BEARING FOR A MILLING MACHINE HEAD

BACKGROUND OF THE INVENTION

This invention relates generally to metal-cutting machines; more particularly it relates to milling machines of the type having a head which supports a spindle case that is movable in an axial direction with respect to the head. Specifically, it relates to an accessory for such milling machines which is designed to enhance the rigidity of the spindle and any tool mounted within the spindle for operations involving metal cutting, grinding, finishing, etc.

A major machine tool in most any machine shop is a milling machine of the type commonly referred to in the trade as Bridgeport-type mills. Such machines are characterized by having a rather heavy and therefore inherently stable frame which houses the basic drive mechanism for the machine. Attached to the front of such milling machines is a removable head, which is made removable so that it may be more readily taken off the frame for repairs, etc. Within the head is mounted a vertically movable spindle case or quill that supports a spindle in a rotatable fashion. The quill is adapted to move axially within the head for a distance of several inches—typically 5 inches—so that material may be cut through the action of longitudinal movement of the spindle as well as rotation of a tool mounted in the spindle. The head is typically mounted on a ram that can be made to translate with respect to the frame, and the head may also be rotated (or tilted) with respect to the forward end of the ram. Hence, a tool mounted on a Bridgeport-type mill can be selectively moved along any or all of three orthogonal axes.

Because of the axial (or longitudinal) movement of the quill (and its spindle) which is an inherent part of Bridgeport-type mills, the rigidity with which those mills may cut metal has always been less than might be obtainable—if movement of the spindle was not necessary or desirable. Nevertheless, the versatility of such milling machines has made them common "work horses" in nearly all machine shops that are adequately equipped, and there are now believed to be about 3,000,000 of such machines in the U.S. alone. While the basic Bridgeport design is definitely an accepted design, there has nevertheless remained a desire on the part of at least one person that the productivity of such machines be improved. It is an object of this invention to provide an increase in productivity by more firmly supporting the spindle case with respect to the machine head—such that tool chatter and the like can be reduced to the point of being essentially negligible.

Another object is to provide a modification for Bridgeport-type milling heads which will compensate for wear within O.E.M. bearings without requiring expensive re-building of those heads and replacement of the internal bearings, etc.

Another object is to improve tool life and increase the possible cutting speed of tools by minimizing tool vibration during traditional cutting processes.

These and other objects will be apparent from a reading of the specification and the claims appended thereto, as well as the figures provided herewith. In the specification, the following commonly understood abbreviations will sometimes be used as a short and convenient way of referring to certain words and phrases: ID for "inside diameter," OD for "outside diameter," and O.E.M. for "original equipment manufacturer."

BRIEF DESCRIPTION OF THE INVENTION

A milling machine of the Bridgeport type has a head which supports a quill that is movable longitudinally with respect to a fixed housing. A tool-holding spindle is rotatable within the vertically movable quill. This invention includes an auxiliary bearing means for selective attachment to the housing near the bottom of the head, and includes a support bearing that is adapted to engage and firmly support the lower end of the rotatable spindle against unwanted movement with respect to the housing. When the auxiliary bearing is installed, any tool which is mounted in the spindle can be more rigidly supported during operation of the milling machine at those times when the quill is fully retracted into the housing. When the quill is to be lowered for operation in accordance with its original design, the auxiliary bearing is simply removed by the machinist. The auxiliary bearing may be replaced at any time, and it will function just as reliably as when it was first installed, as long as it is tightly mounted against a machined reference plane.

DETAILED DESCRIPTION OF THE PREFERRED EMBODIMENT

Figure 1:
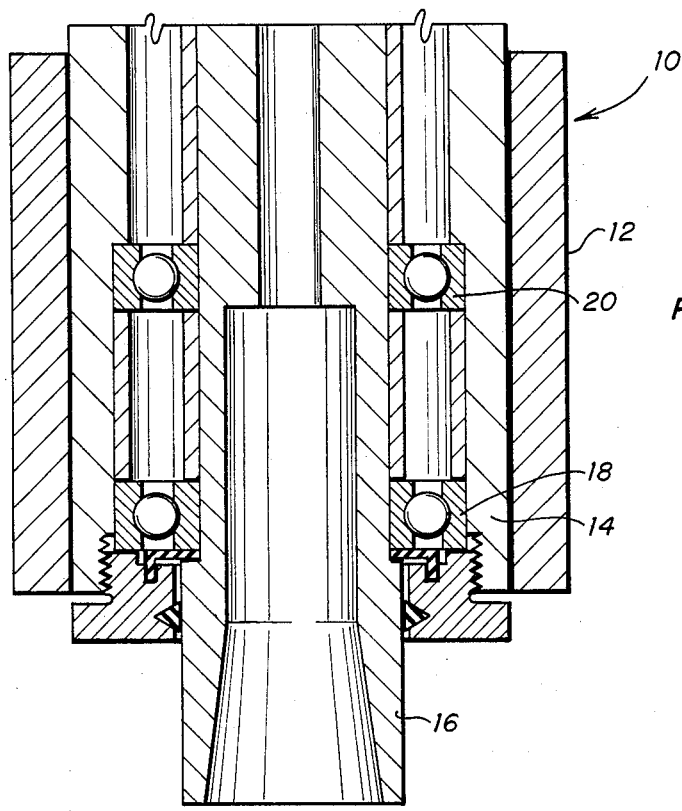
FIG. 1 is a cross-sectioned elevational view of the lower portion of a typical milling machine head having the capacity to move a quill and its associated tool longitudinally with respect to a bare provided in the head, and showing the traditional bearing supports which allow the spindle to rotate with respect to the longitudinally movable quill.
Figure 3:
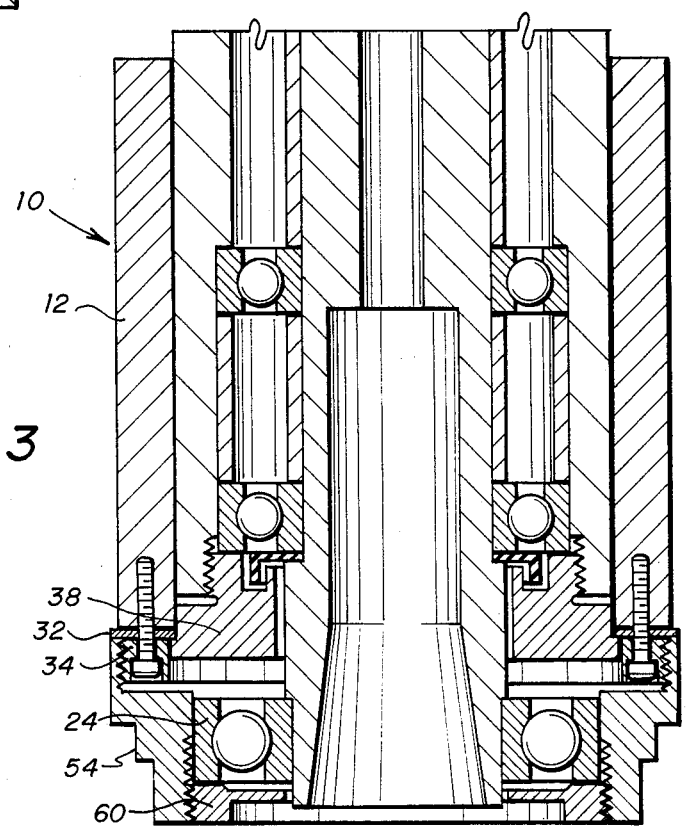
FIG. 3 is a cross-sectioned elevational view similar to FIG. 1 but showing the modification of this invention as installed on the bottom of a milling head, and wherein the spindle is newly supported both vertically and transversely.

Referring initially to FIG. 1, a typical head 10 for a milling machine of the Bridgeport-type is shown; this particular illustration shows the head on a MAXMILL turret-type milling machine produced by Yeong Chin Machinery Industries, Ltd. of Taiwan, R.O.C. It has an external housing 12 which is rigidly anchored to the main frame of the machine (not shown), so that it may be considered to be a significantly rigid and stable base. Typical Bridgeport mills weigh 3,000 pounds or more, because their main frames are usually fabricated from massive cast iron pieces and they are inherently quite heavy. Once installed on a suitable foundation, such machines are not prone to even small movements, and they have the capacity of providing very stable working platforms.

While a housing 12 can be extremely stable, a quill 14 is adapted to move axially or longitudinally (up and down) with respect to the fixed housing, and it must inevitably have some clearance; this clearance introduces the first region of instability in a tool that is to be rotated by the machine. Expressed in other words, a quill cannot move with respect to its supporting housing if the clearance between the two is less than zero (i.e., if there is an interference fit between the two). At essentially zero clearance, no relative motion would be possible; but zero clearance is more of a theoretical concept than a practical reality. Therefore, at least some clearance (even approaching as much as 0.005 inch) is fairly common. And, this initial clearance between housing 12 and quill 14 is only the start of loss of stability for a cutting tool of the prior art.

Carried within a bore in the quill is rotatably supported spindle 16 which is typically supported by three sets of roller bearings, two of which 18, 20 are illustrated in the lower part of head 10. The third bearing (not shown because of the scale of this figure) is provided in the upper part of the head 10. These three bearings do a fairly adequate job of supporting the spindle and any tools that may be mounted therein, but they are not the ultimate in tool-supporting systems. So, any vibration that occurs when a tool is cutting into some workpiece can generate sufficient tool chatter as to impose excessive impact loads on the tool—with the result that the tool often breaks much quicker than might be expected. Experienced people know that many tools break long before they are worn out, because they are not supported in a stable manner when they are used to cut hard material. Tool breakage is especially common if a machinist tries to use a carbide cutting tool for cutting something hard—like steel—with anything less than an extremely rigid foundation.

The second region of instability for a cutting tool is found in the bearings 18, 20 that were provided in the head 10 at the time that it was originally manufactured; these bearings will therefore be referred to as O.E.M. bearings. While the quality of these O.E.M. bearings may be quite good, it is inevitable that they will wear with use, and the clearances between the rotatable spindle and a static quill will tend to increase with use of the machine. A third region of instability as far as the tool is concerned is the support that the tool holder receives within the spindle. For clarity in illustrating this invention, any depiction of a tool has been omitted, and the socket (which normally receives the tool) has been shown empty. It will be appreciated by those skilled in the art that any tool which is traditionally mounted in such a spindle can be utilized in accordance with the teachings contained herein, so no illustration of a specific tool is believed to be necessary.

Figure 2:
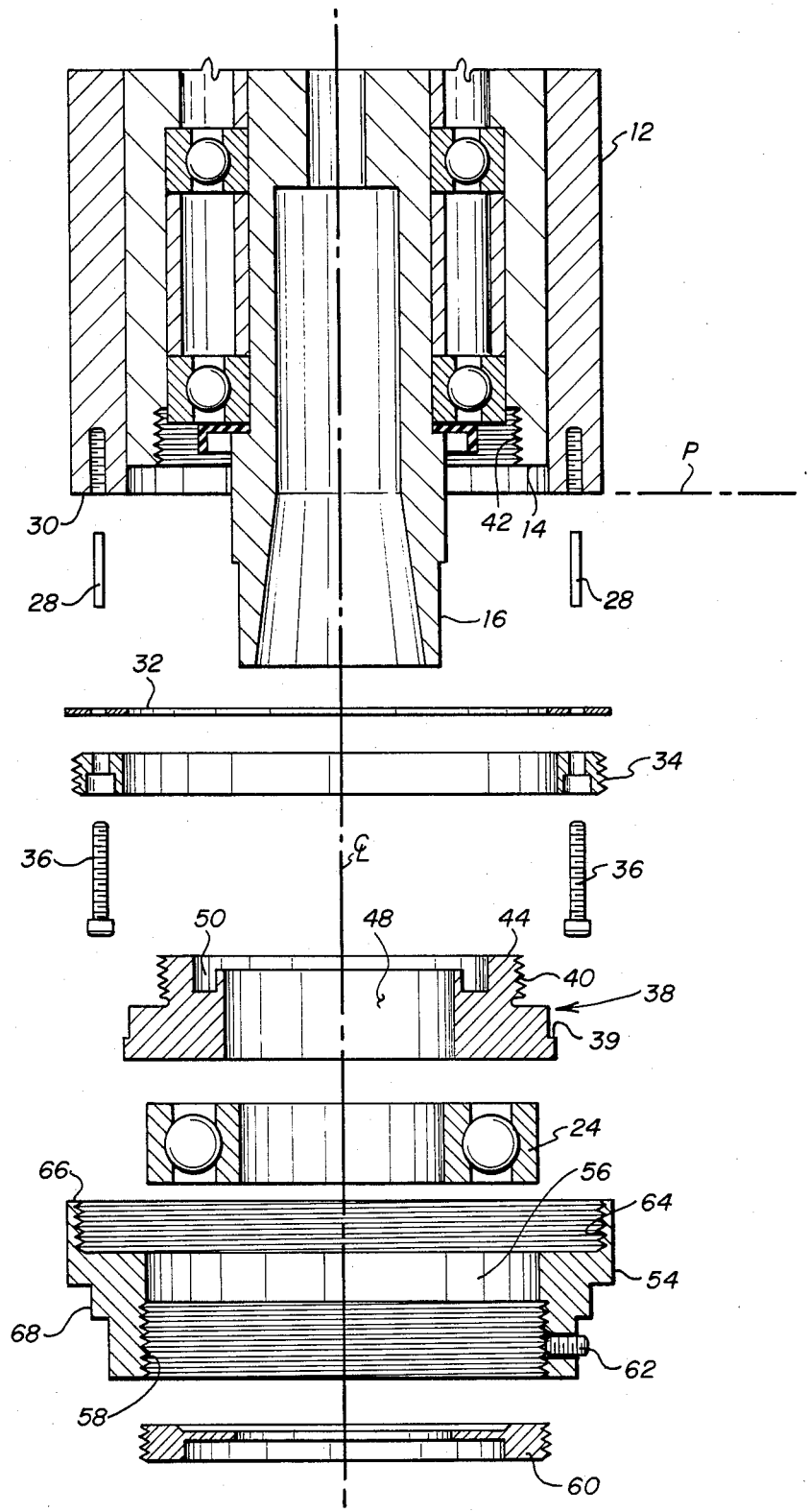
FIG. 2 is an exploded view of this invention as it would be installed on a head like that of FIG. 1—after the head has been slightly modified in accordance with the teachings herein.
Figure 4:
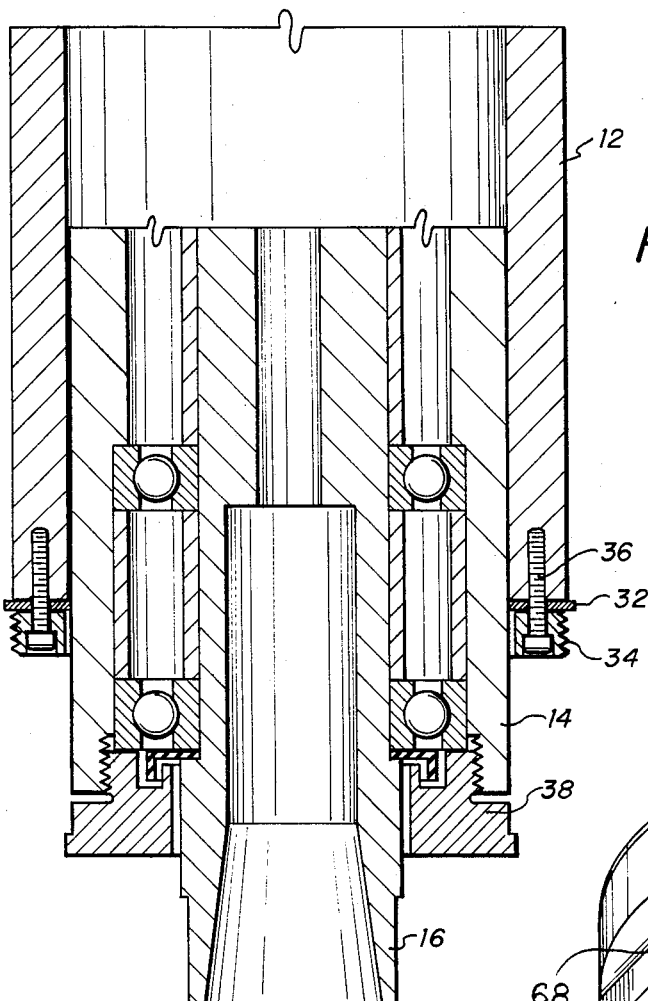
FIG. 4 is a cross-sectional view similar to that of FIG. 3 but showing the spindle and its supporting quill in a lowered position, with the removable bearing assembly having been first removed so that the quill could be lowered.
Figure 5:
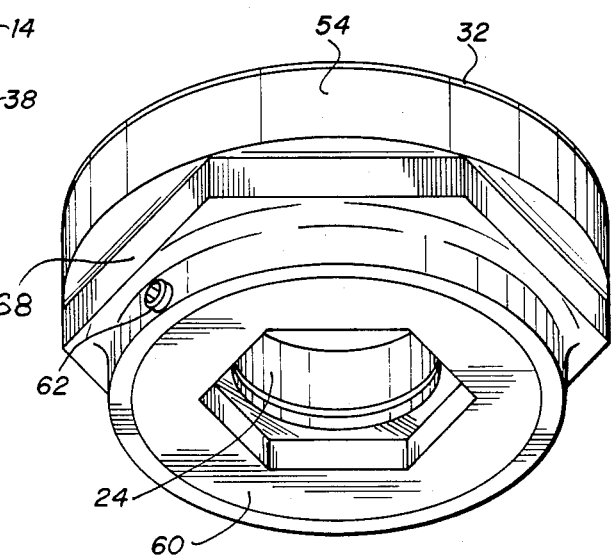
FIG. 5 is a perspective view of the new bearing assembly, showing it removed from a milling machine head.
Figure 6:
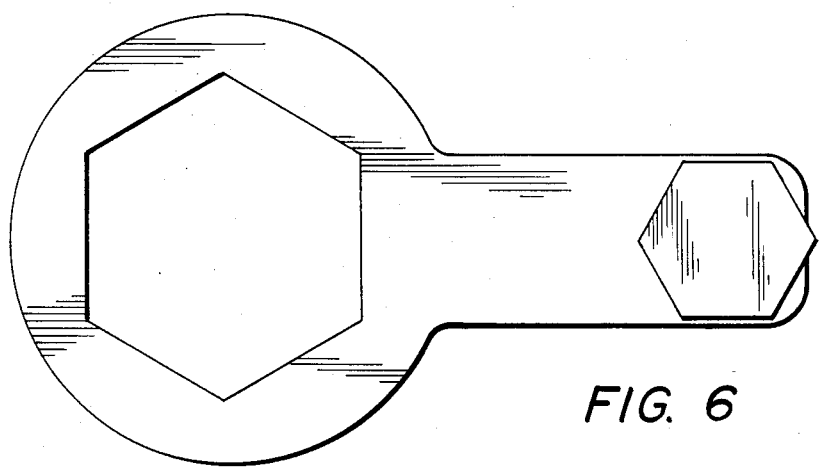
FIG. 6 is a top plan view of a tool which is useful in removing and installing the new bearing assembly on a milling machine head.

Referring next to FIG. 2, a modified head in accordance with this invention is shown at the same scale and taken in a plane similar to that illustrated in FIG. 1; but it is shown exploded in order to promote clarity in this description. The most obvious difference between the showings of FIGS. 1 and 2 will be the addition of a new bearing 24, and it is this bearing that may be described as the heart of a modification to an existing machine. But the new bearing 24 must be correctly located in order to achieve the advantages that are made possible by this invention; and the achievement of correct location starts with parts that are shown—in FIG. 2—as being quite remote from the bearing, so they will be described first.

Starting at the top of FIG. 2, a set of locating dowels 28 are illustrated with the approximate spatial arrangement that they would have when four such dowels are evenly distributed around the lower face of housing 12; this face will be identified by the reference numeral 30 and, as will be explained hereinafter, it constitutes a new finished (i.e., machined) face on the housing 12. Below the dowel pins is shown a pressure ring 32. This part is identified as a "pressure ring" because it serves to transmit pressure from the bearing assembly that will be installed below the ring—to the cast iron housing 12, which of course usually has relatively little tensile strength. Also, the pressure ring or washer 32 can be made relatively hard—in contrast to the housing 12, to help protect the housing against fracture as the lower parts are subsequently made up. The preferred material for the pressure ring 32 is 4340 alloy steel which is heat treated to a Rockwell hardness of about Rc 40 after the appropriate holes have been drilled in it—to accommodate the preferred bolts and dowel pins.

Next, a new threaded ring 34 is affixed to the bottom of the housing 12 by a plurality of bolts 36; typically, eight 10×24 Allen-head heat-treated bolts are employed so as to provide a strong and dependable connection between the threaded ring 34 and the housing 12. The exterior of ring 34 is provided with "8 round" threads having a pitch of about eight threads per inch and a depth of about 0.050 inch. These "8 round" threads are similar to Whitworth form threads and have rounded peaks to minimize galling. When the height of the ring 34 is aboue ⅜ inch, approximately three threads will be provided on the exterior of ring 34. The ID of ring 34 is large enough to completely clear a modified bearing retainer 38 which, in part, replaces the original bearing retainer in the bottom of the head; this ring has external threads 40 in its upper portion, which threads engage the original threads 42 on the inside of spindle 16. A top surface 44 on retainer 38 is squared and smoothly finished so as to bear positively against the outer race of O.E.M. bearing 46. The bearing retainer 38 has a central bore 48 which is sufficiently large as to provide adequate clearance for the spindle 16. Also, near the top of retainer 38 is provided a tree-pan slot 50 which functions as a reservoir for the slinger--in order that lubricating oil for the O.E.M. bearings may be slung upward to accomplish the intended lubrication.

Positioned below the bearing retainer 38 is the new bearing 24 which is shown suspended above its retainer 54. A preferred bearing is one that is larger than the O.E.M. bearings, and it has a greater precision, probably, than many old O.E.M. bearings. Such a bearing is available from the Fafnir Bearing Division of Textron Inc., and is identified as an angular contact precision bearing and further identified as a 2MM200WI type bearing. For the size that is desired, a No. 2MM209WI bearing is preferred; it has an ID of 1.7717 inches, so a new ground surface on the spindle should be provided with essentially the same dimension, whereby a tap fit can be achieved between the two parts. A preferred surface finish for the new ground surface on the spindle is about 30 micro-inch.

Turning attention now to the bearing support 54, it obviously has an internal bore 56 with ground sides to receive the bearing 24 with a tap fit. The bottom portion of the bore 56 is threaded, preferably with standard 60° threads having a pitch of 20 threads per inch. These internal threads 58 are adapted to engage external threads in a pre-load nut 60 which is important for providing the desired rigidity and support for the rotating spindle—at the time that the appendage described herein is first installed and during any subsequent installations. To this end, an irregular shaped recess (e.g., hexagonal) is provided in the lower face of the nut 60, so that it may be turned clockwise in order to force bearing 24 upward. Also visible in FIG. 2 is a ¼ inch set screw 62 which is provided to hold the pre-load nut 60 in a selected position within retainer 54; that is, once the appropriate pre-load has been established on bearing 24, set screw 62 ensures that that load will be retained, at least until a new setting is someday perhaps desired.

Also provided on bearing retainer 54 are internal threads 64 which are "8 round" threads of the same size and pitch to engage external threads of ring 34. The top surface 66 of retainer 54 is machined and polished so that it will bear against the outer circumferential part of pressure ring 32 when the bearing retainer is tightened during installation. To permit such tightening of retainer 54, an irregular external configuration is provided at some location on the retainer, so that a wrench or other tool may be employed to adequately tighten the retainer. The preferred configuration is that of a hex head, which is achieved by machining six flats 68 on the outside of some portion of retainer 54.

To accomplish installation of this new bearing on an old milling machine head, the following process is advantageously followed.

The first step is to remove the bolts (typically three in number) that hold the motor and gear box on top of the quill 14. Next the four horizontal bolts that hold the housing 12 to the machine ram are removed. This will permit the housing 12, quill 14 and spindle 16 to be pulled away from the ram as a unit. This group of parts will typically weigh about 70 pounds, and can be routinely handled by persons familiar with machine shop practice. The next step is to remove the original bearing pre-load nut 26 and discard it as being of no further use. This will permit the quill 14 and spindle 16 to be removed from the housing 12.

The lowermost end of the spindle is then ground to provide an OD to receive the ID of the auxiliary bearing that will be provided as a part of the new bearing assembly. The next step involves machining the bottom end of the housing to "face" it and make it square with the center line of the bore in which the quill slides. This step is significant, because—in accordance with this invention—the angular orientation of a precision bearing is very important with respect to the center line of the spindle; and the most expeditious way of achieving this spatial arrangement is to establish a control surface or reference plane on some rigid structure (like the housing 12) and position everything with respect to it.

Next, the dowel pins, typically four in number, are tapped into prepared holes in the housing. These dowel pins 28 ensure that the threaded ring 34 will be put in proper alignment when it is connected to the housing by bolts 35. Next, a replacement bearing retainer 38 is threaded into the bottom of the quill 14 by engaging threads 40, 42. Engagement is continued until a shoulder 39 on bearing retainer 38 comes into contact with the inner circumferential portion of pressure ring 32—which provides a positive stop for retainer 38.

All of the above items are adapted to remain permanently with the modified head, without in any way affecting its original mode of operation. When the benefits of the new auxiliary bearing are desired, a machinist will simply pick up bearing retainer 54 (and its associated bearing 24) and screw it onto the housing extension 34.

The pre-load nut 60 is then adjusted upward until the bearing 24 is pre-loaded. The machine is then turned on, causing the spindle to rotate at, say, 1000 rpm. When the proper pre-load has been established on bearing 24, the housing of retainer 54 should be only modestly warmed. If the housing is not warm to a person's touch, appropriate adjustments are made by rotating the nut 60. The set screw 62 is then tightened to maintain this load setting on the spindle. The retainer 54 may then be removed and re-installed as many times as is necessary, without altering the setting that has been established. Hence, switching back and forth between the machine's original configuration and this new stabilized configuration may be done very quickly.

While an old milling machine head may be modified in accordance with the teachings herein in about three hours, this invention could—of course—be incorporated into a new machine with much less expenditure of time. Hence, the invention is applicable to both old and new milling machines, and the advantages it provides in tool stability are equally available to both.

While only the preferred embodiment of the invention has been disclosed in great detail herein, it will be apparent to those skilled in the art that modifications can be made without departing from the spirit of the invention. Thus, any specific structure shown herein is intended to be exemplary and is not meant to be limiting, except as described in the claims appended hereto.

What is claimed is:

1. In a milling machine of the type having a head which supports a quill that is movable longitudinally with respect to a fixed housing, and a tool-holding spindle being rotatable within the quill, the improvement comprising:
    (a) an auxiliary bearing means for selective attachment to the housing near the bottom of the head, and including a support bearing that is configured to engage and firmly support the lower end of the rotatable spindle against unwanted movement in a sideward direction with respect to the housing, whereby a tool which is mounted in the spindle can be more rigidly supported during operation of the milling machine at those times when the quill is fully retracted into the housing; and
    (b) means for selectively attaching the auxiliary bearing means to the housing when the quill is fully retracted into the housing.

2. The combination as claimed in claim 1 wherein the means for selectively attaching the auxiliary bearing means to the housing includes a nut for threaded engagement with a structural extension of the housing, and the support bearing being structurally supported by said nut, and said nut being adjustable longitudinally with respect to the housing so as to place a desired pre-load on the support bearing, whereby the relative rotational freedom of the spindle with respect to the housing may be adjusted directly by virtue of adjusting the position of the nut with respect to the housing.

3. The combination as claimed in claim 1 wherein said means for selectively attaching the auxiliary bearing means includes a bearing holder which has interior mounting threads, and the support bearing is mounted within said holder, and the lower part of the housing is provided with an extension which has exterior threads which are complementary to the bearing holder's interior threads, whereby the support bearing is installable at will on a milling machine by engaging the respective threads on the bearing holder and the housing extension.

4. The combination as claimed in claim 1 wherein the quill is secured in its highest and most internal position within the housing when the support bearing is installed, such that the spindle is then supported by the housing with its greatest degree of rigidity, and the quill is free to be lowered from the housing when the support bearing has been temporarily removed from the housing.

5. The combination as claimed in claim 1 wherein the auxiliary bearing means may be selectively attached and removed from the fixed housing by manipulation of a single threaded member, said single threaded member constituting an internally threaded housing for supporting the auxiliary bearing means, and the threads on the internally threaded housing being complementary to external threads on a structural extension of the milling machine's fixed housing.

6. The auxiliary bearing means as claimed in claim 1 wherein the confronting rubbing surfaces on the inside diameter of a support bearing and the outside diameter of an adjacent portion of the spindle are ground to provide about a 30 micro-inch finish, and the fit between the confronting surfaces is a tap fit, whereby the spindle is very firmly held by the support bearing when said bearing is attached to the housing.

7. An appendage for a milling machine of the type having a head which supports a longitudinally movable quill, said quill being movable with respect to a fixed housing between a retracted position and an extended position, and said quill rotatably supporting a tool-holding spindle, comprising:

(a) an auxiliary bearing adapted to be affixed to the housing of said milling machine head and to provide direct bearing support between the housing and the rotatable spindle, when the spindle is intended to be rotated while the quill is in its retracted position; and (b) means for selective attachment of the auxiliary bearing to the housing, such that said auxiliary bearing may be removed from its installed position with regard to the housing at any time that logitudinal movement of the quill with respect to the housing is desired, and removal of the auxiliary bearing being necessary whenever the quill is to be moved away from its retracted position to an extended position, whereby the advantage of increased spindle support may be obtained when the appendage is installed, and whereby the original movement capabilities of the quill may be restored whenever the appendage is removed, and such that removal of the appendage does not in any way diminish the original properties of the machine.

8. The appendage as claimed in claim 7 wherein said means for selective attachment comprises a singular threaded member, said singular threaded member constituting an internally threaded housing for supporting the auxilliary bearing, and the threads on the internally threaded housing being complementary to external threads on a structural extension of the milling machine's fixed housing, whereby installation and removal may be quickly accomplished by manipulating a single part of the appendage.

9. The appendage as claimed in claim 7 wherein the means for selective attachment of the auxiliary bearing includes a bearing retainer, and further including means for pre-setting the position of the auxiliary bearing within the bearing retainer, said bearing retainer having mounting threads which are complementary to threads that are provided on a structural extension of the fixed housing of the head, such that the bearing will be preloaded when the bearing retainer is returned to its installed position on the housing, regardless of how many times the bearing retainer has been removed from the housing.

10. The appendage as claimed in claim 7 and further including a hardened steel member which is adapted to be installed on the housing with a precise orientation such that it is perpendicular to the center line of the spindle, and the auxiliary bearing being mountable with respect to the housing in such a way that it is exactly parallel to the hardened steel member.

11. The method of rendering more stable the operation of a milling machine having a quill that is adapted to move longitudinally within a bore that is provided within a rigid housing of said milling machine, and the quill carrying a rotatable spindle that is adapted to hold tools used in cutting, grinding, boring and metal-finishing processes, comprising the steps of:

(a) fully retracting the quill into a bore in the housing, such that the spindle is exposed below the housing for a relatively short distance which will typically be on the order of one inch; and (b) mounting an auxiliary bearing to the bottom of the housing, and said bearing having an inside diameter which matches the outside diameter of an exterior surface on the exposed part of the spindle, such that working loads on the spindle may be transferred through the auxiliary bearing directly to the rigid housing, and whereby vibration in a working spindle may be rendered essentially non-existent.

12. The method of rendering more stable the operation of a milling machine as claimed in claim 11 and including the further step of grinding the lower surface of a portion of the spindle so as to establish a new cylindrical surface which can be supported within the auxiliary bearing, whereby a used milling machine with old and possibly worn bearings can be rendered more stable by creating a new bearing surface on an old spindle.

13. The method of rendering more stable the operation of a milling machine as claimed in claim 11 and including the further step of providing a single threaded joint between the rigid housing and a new bearing retainer, said new bearing retainer being adapted to support the auxiliary bearing with respect to the housing, such that the new bearing retainer and its associated bearing may be selectively removed from the rigid housing as a unit by disengagement of a single set of threads.

14. The method of rendering more stable the operation of a milling machine as claimed in claim 11 and including the further step of establishing a fixed reference plane at the bottom of the milling machine housing, said plane being perpendicular to the longitudinal axis of the quill, and subsequently installing the new auxiliary bearing at a controlled position so that it is parallel to the reference plane, whereby repetitive removal and re-installation of the bearing assembly can be accomplished by establishing an appropriate spatial relationship between the auxiliary bearing and said reference plane, regardless of how many times the auxiliary bearing has been removed.

* * * * *